Figure 1:
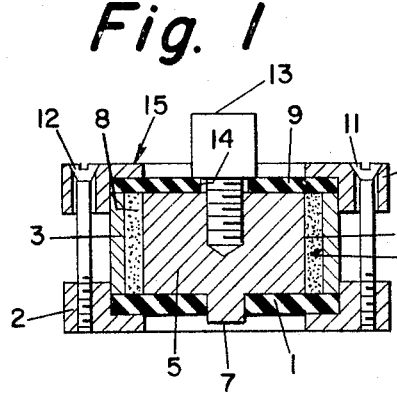

Aug. 2, 1966      J. LERNER      3,263,492

STREAM MOISTURE INDICATOR

Original Filed April 24, 1961

INVENTOR.
JULIUS LERNER
BY George L. Church
ATTORNEY

United States Patent Office 3,263,492
Patented August 2, 1966

3,263,492
STREAM MOISTURE INDICATOR
Julius Lerner, Broomall, Pa., assignor to Sun Oil Company, Philadelphia, Pa., a corporation of New Jersey
Continuation of application Ser. No. 104,874, Apr. 24, 1961. This application July 25, 1963, Ser. No. 297,650
4 Claims. (Cl. 73—53)

This application is a continuation of my copending but now abandoned application, Serial No. 104,874, filed April 24, 1961.

This invention relates to an indicator or recorder for the measurement of moisture in a fluid stream. This stream may comprise hydrocarbon material, or other material incompatible with water.

In the case of many hydrocarbon streams, such as occur in refineries, it is essential to measure the moisture content, when that exists in an amount which may be of the order of only a few parts per million. By way of example, propane sold for domestic consumption must contain less than about thirty parts per million of water. Feedstreams in various processes must also be kept at less than some very low water content, for optimum performance of processes. Laboratory procedures for the checking of such low moisture content are known, but they are not suitable for continuous stream monitoring.

A general object of the present invention is to provide an improved stream moisture monitoring or measuring system which is continuous in operation, and which gives its results on an indicating or recording meter. Specifically, in accordance with the invention, the desired measurement is secured by taking advantage of the fact that various materials reach equilibrium conditions with respect to moisture content, when exposed to particular low concentrations of moisture in hydrocarbon or similar non-aqueous carriers. For example, a desiccant or water-sorptive material such as alumina will adsorb moisture from a fluid hydrocarbon stream, in proportion to the amount of water in the stream. If the water content of the stream is increased, the desiccant adsorbs more water, until an equilibrium condition is reached. If the water content of the stream is then reduced, the water-sorptive material will give up water to the stream and re-establish a new equilibrium point, corresponding to the new lower water concentration. The concentration of water in the wet desiccant is, of course, much greater than the concentration in the stream, and the variations of the water content of the former are sufficient so that, by measurement of the dielectric constant of the wet desiccant, there may be made a measure of the water content of the fluid stream. While the change of concentration of water in the desiccant, and consequently its dielectric constant change, lags the change of moisture content in the fluid stream, equilibrium is reached sufficiently fast so that for practical purposes a satisfactory monitoring condition is achieved.

Measurement of the dielectric constant of the wet desiccant (water-sorptive material) may conveniently be made by measuring the capacitance of a capacitive sensing unit wherein the water-sorptive material is the dielectric material between two spaced conductive electrodes or plates.

Another object of the invention is to provide a novel capacitive sensing unit construction, one which possesses several substantial advantages as compared to prior or known constructions.

Figure 2:
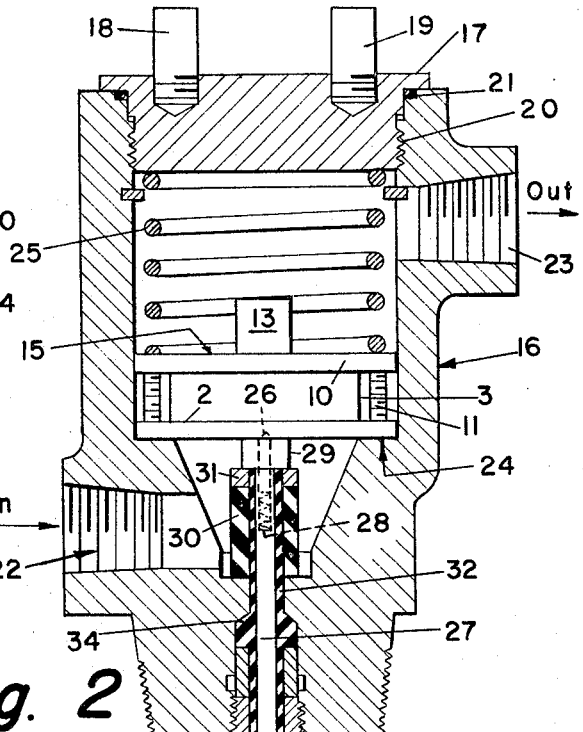
Figure 3:
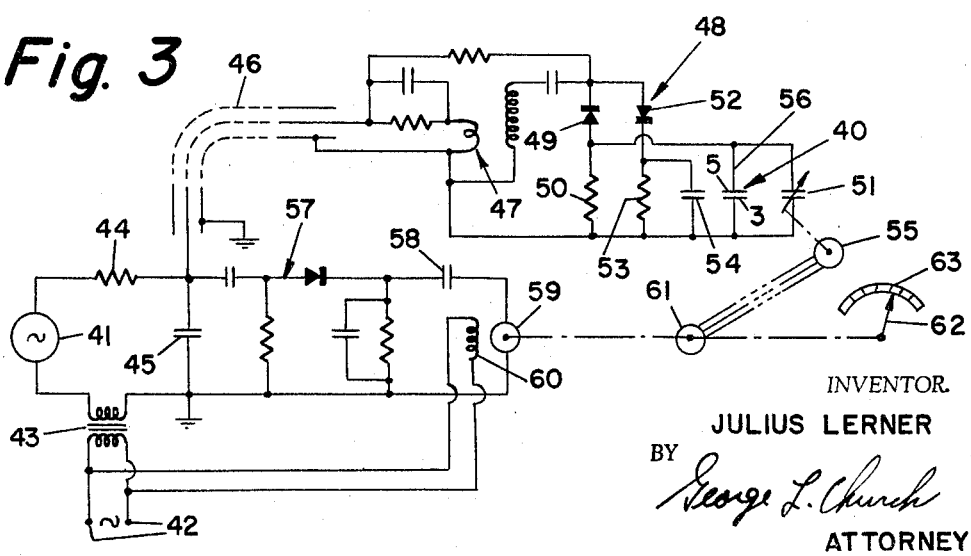

A detailed description of the invention follows, taken in conjunction with the accompanying drawing, wherein:

FIG. 1 is a longitudinal sectional view of a capacitive sensing unit according to this invention;

FIG. 2 is a longitudinal sectional view showing the unit of FIG. 1 mounted for use as a stream moisture sensing unit, the assembly of FIG. 2 being such that either a main stream or a sampling stream (drag stream) of the fluid to be analyzed is applied to the capacitive sensing unit; and FIG. 3 is a wiring diagram illustrating a form of capacitance measuring circuitry which may be used with the FIG. 2 assembly.

Referring first to FIG. 1, which illustrates the capacitive sensing unit of this invention, it may be stated in general that this comprises a concentric plate capacitor with cylindrical electrodes which are separated by a dielectric material having water-sorptive properties. A porous disc 1, made of electrical insulating material, is mounted in a metallic end flange 2. By way of example, disc 1 may be made from a suitable thermoplastic material, such as a tetrafluoroethylene resin known as "Teflon" which has been treated in a special way to make it porous. Such a porous thermoplastic material is commercially available. One end of an impervious (solid) metallic outer ring member or tube 3 is pressed into flange 2, this member having an inner cylindrical face 4 and being adapted to serve as one conducting electrode of a capacitor. The outer diameter of member 3 is equal to the diameter of disc 1, and the lower end face of member 3 overlies disc 1, at the outer edge of the latter. An impervious (solid) metallic inner cylindrical member 5 is mounted in superposed relation on disc 1, member 5 being coaxial with but spaced from member 3. Members 3 and 5 are coextensive in length (height). Member 5 has an outer cylindrical face 6, which is in opposed relation to face 4 of member 3; the faces 4 and 6 provide an annular space therebetween. The member 5 is adapted to serve as the other conducting electrode of the capacitor previously referred to. The inner electrode 5 is centered in position by means of an integral downwardly-extending axial hub 7, which extends, with a press fit, through an axial aperture provided in disc 1.

The annular space between faces 4 and 6 is completely filled with a powdered desiccant material 8 which may have various compositions. Since this material is present in the space between the conductive electrodes 3 and 5, it can serve as the dielectric for the capacitor. The desiccant material may, for example, be alumina. Other suitable desiccants are silica gel, calcium sulfate, or the like. Other types of materials which are suitable are those known as synthetic zeolites, which operate as molecular sieves; such materials are sodium, or calcium, aluminum silicate.

All that is required for the desiccant is a dielectric material which is not acted upon chemically or dissolved by the fluid stream (which may, for example, be a hydrocarbon stream), which does not react with water, but which adsorbs water in such fashion that the adsorbed water content reaches a varying equilibrium in accordance with the moisture content of the hydrocarbon or other non-aqueous stream. Under such conditions, the capacitance of the unit, measured between electrode faces 4 and 6, will reflect the changes in adsorbed water content, and, consequently, the changes in the moisture content of the stream. The effective dielectric constant is dependent also on the dielectric constant of the stream itself. However, the contribution of the stream is under ordinary conditions a constant; consequently, variations in capacitance depend solely on the stream moisture content.

The foregoing has assumed that the fluid stream is caused to flow through the dielectric material 8, and that moisture in such stream affects the dielectric constant afforded by the material 8. The flow of the fluid stream through the dielectric material will be described in more detail hereinafter.

After the annular space is filled with desiccant 8, a porous disc 9 is placed on the top of the central member or core 5, this disc having the same diameter as disc 1. Disc 9 overlies the upper end face of member 3, as well as that of member 5. Disc 9 is made of electrical insulating material, and may be made of the same material as disc 1. It is pointed out that the porous members 1 and 9, which are positioned at respective opposite ends of the cylindrical members 3 and 5, extend in a direction generally transverse to the faces 4 and 6, and cover the respective opposite ends of the annular space between members 5 and 3.

A metallic upper end flange or clamp plate 10, similar in outer configuration to the lower flange 2, engages the upper face of disc 9 and the upper end of member 3, in the same way that flange 2 engages the lower face of disc 1 and the lower end of member 3. The two diametrically-opposite machine screws 11 and 12 hold the capacitive sensing unit of FIG. 1 together. The shanks of these screws pass freely through respective countersunk bores in upper flange 10 and thread into respective aligned tapped holes provided in lower flange 2.

A screw 13, made of a thermoplastic electrical insulating material such as the "Teflon" previously referred to, passes through an axial aperture 14 in disc 9 and threads into an axial tapped hole provided at the upper end of member 5. As shown, screw 13 is of enlarged diameter at its upper end, to provide a centrally-located handle which may be grasped for lifting the assembled sensing unit, which unit is denoted in its entirety by numeral 15.

It is to be noted that the central electrode 5 is electrically insulated from the outer electrode 3 by means of insulating discs 1 and 9, and also, of course, by means of the dielectric material 8.

As previously stated, the electrodes 3 and 5 are solid metallic or impervious, so no fluid can take place through these members. Therefore, when a fluid stream is caused to traverse the sensing unit or cell 15 in a vertical direction in FIG. 1, the stream is directed by means of the various members (including discs 1 and 9) through the desiccant (dielectric) material 8 in a direction parallel to the common vertical axis of electrodes 3 and 5, that is, in a direction substantially parallel to the faces 4 and 6. The fluid flow is up through an annular region of porous disc 1, then upwardly through the annular body of dielectric material 8, then up through an annular region of porous disc 9. The flow through discs 1 and 9 is in the vertical direction, that is, parallel to the thickness dimension of these discs.

Refer now to FIG. 2, which illustrates the capacitive sensing unit of FIG. 1 mounted and assembled for use as the sensor of a stream moisture sensing device. The open upper end of a housing 16 is adapted to be closed by a removable cap or closure 17. Two upstanding or outwardly-projecting pins 18 and 19 are secured to the outer or upper face of closure 17, at respective diametrically-opposite points. By means of a piece of metal (such as a rod or pipe) inserted between the pins 18 and 19, and acting against the sides of these pins, the cap 17 may be manually rotated to tighten or loosen the same, with respect to the housing or body 16. The threaded construction 20 (male threads on cap 17 and mating female threads in housing 16) maintains the cap in place on housing 16, against the internal pressure. The seal 21, illustrated as an O-ring positioned in a groove between cap 17 and housing 16, keeps the joint between the cap and the housing pressure-tight.

Lower and upper side ports 22 and 23, respectively, which communicate with the interior of the body or housing 16, provide respectively for the entry and exit of a hydrocarbon stream, or other fluid stream to be analyzed moisture-wise. The main stream of hydrocarbon may flow through these ports (and through housing 16), or they may act merely as a bypass to a main stream, this bypass then providing a small sample stream (which may be termed a drag stream) to be analyzed.

In the later or bypass arrangement, to ensure continuous flow through the housing 16 a pressure-dropping device (for example, a restricted orifice) is provided in the main stream. The fluid stream undergoing measurement may be either liquid or gaseous.

Body 16 has an internal shoulder 24 (located between the ports 22 and 23) which supports the concentric plate capacitor unit 15. Note that unit 15, which is shown in detail in FIG. 1, is shown merely in elevation in FIG. 2, for purposes of simplicity. The unit 15 is placed in body 16 against shoulder 24, with the lower or exterior face of flange 2 touching this shoulder. A helical compression spring 25, one end of which engages the lower or inner face of cap 17 and the opposite end of which engages the upper or outer face of flange 10, urges unit 15 downwardly and keeps surfaces 2 and 24 in close contact.

When the sensing unit 15 is positioned in housing 16 as illustrated, the fluid stream to be analyzed can enter housing 16 by way of port 22, from whence it flows upwardly, through disc 1 of the unit (see FIG. 1), upwardly through the annular space between electrodes 3 and 5 (and also, of course, through the disiccant 8 filling this annular space), thence through disc 9, and out of the housing by way of port 23. Above inlet port 22, a tapered transition section increases the diameter of the fluid flow channel in an upward direction, so that the fluid stream can radially reach the annular space between electrodes 3 and 5.

With the arrangement described, electrode 3 of unit 15 (which is in intimate metallic contact with lower flange 2) is grounded to the housing 16, while central electrode 5 (electrically insulated from electrode 3, as described hereinabove) is floating, or insulated from the housing. To provide electrical connection to electrode 5 of unit 15, a centrally-located plunger 26 (pointed at its upper end, as illustrated) is mounted in an axial hole in the upper end of a pin 27. A compression spring 28, one end of which engages the bottom of the axial hole in pin 27 and the opposite end of which engages the bottom of plunger 26, urges this plunger against hub 7 of electrode 5. In other words, spring 28 forces plunger 26 against the hub 7, thus making electrical contact with central electrode or core 5 of unit 15. Electrical contact is made from plunger 26 to pin 27 either directly (since metal plunger 26 is mounted in a hole in metal pin 27), or through spring 28 (which metallically contacts both the pin and the plunger).

To maintain the upper end of pin 27 (and thus, also, the plunger 26) in proper position, pin 27 has an integral collar 29 at its upper end which is supported on a spacer 30 of electrical insulating material, such as "Teflon." The lower end of spacer 30 contacts the lower end of the cavity of housing 16, while the upper end of this spacer engages the lower surface of a metal washer 31 (made, for example, of stainless steel) whose upper surface engages in turn the lower end of collar 29.

Pin 27 extends downwardly through a suitable bore in the wall of housing 16, an elongated sleeve 32 of electrical insulating material (such as "Teflon") being positioned between pin 27 and the housing 16, so as to electrically insulate said pin from the grounded housing. A packing gland arrangement 33, which operates on an enlarged-diameter portion 34 of sleeve 32, provides a pressure-tight seal around pin 27. It may be seen that the insulating sleeve 32 electrically insulates pin 27 from housing 16, and also from packing gland arrangement 33.

The lower end of pin 27 is provided with male threads, and an ungrounded terminal connection (solder lug) 35 is fastened and electrically connected to this pin by means of nuts 36 and 37 (positioned respectively above and below item 35) which engage such threads. A washer 38 of electrical insulating material (e.g., "Teflon") insulates nut 36 and terminal 35 from the grounded packing gland arrangement 33, a metal washer 39 being inserted between insulating washer 38 and nut 36. From the foregoing, it will be seen that terminal connection 35 is electrically connected to pin 27, which in turn is electrically connected to central electrode 5 of unit 15; the entire electrical path from lug 35 to the "floating" or ungrounded electrode 5 is electrically insulated from housing 16.

The advantages of the present construction will now be set forth in some detail. The configuration of the capacitive sensing unit 15, as illustrated in FIG. 1, lends itself to greater capacitances, and therefore greater sensitivity, at a lower cost. That is to say, with the present contruction the capacitance of the cell 15 can be increased by simply increasing the length (vertical dimension) of the electrodes 3 and 5. This is very easy to accomplish, and very inexpensive, as compared to increasing the diameter of the electrodes, which latter is the only way in which an increase of capacitance could be effected, with cells of the prior art.

The configuration of the sensing unit of this invention lends itself to high pressure design at a lower overall cell cost. This is true because it is very expensive and difficult to increase the diameter of a pressure vessel, as would be necessary to obtain sufficient capacitance with prior art cells; the cell of the present invention requires no increase in diameter to obtain sufficient capacitance, as discussed in the preceding paragraph.

As illustrated in FIG. 2, the cell 15 fits into the housing 16 with very small side clearance. The provision of the screw and handle 13 makes easy the removal of unit or cell 15 from body or housing 16. If this screw were made of metal, rather than of dielectric material (it may be noted that it is not required to be nonconducting for any electrical insulation purpose), it would have a certain capacitance with respect to the metal housing; this would be a "dead" capacitance in that it would not be moisture-responsive. It is desirable to keep the "dead" capacitance as small as possible, so it is decidedly preferable to make screw 13 of dielectric or electrical insulating material. Also, if the cell of the invention is to be used to measure the moisture in streams of much higher water content, on the order of one thousand parts per million of water, for example, screw 13 should be made of insulating material, to prevent drops of water (which may be present in the housing 16 above unit 15) from short-circuiting electrode 5 to ground (which short-circuiting could occur if this screw were metal, it being connected to electrode 5).

The present construction, including the internal structure of the cell itself, plus the screw cap 17, spring 25, etc., enables field servicing (cell replacement) to be done without any tools. That is to say, there is always a scrap piece of rod or pipe lying around a refinery, and the cap 17 can be unscrewed (by means of pins 18 and 19) merely with the aid of such rod or pipe. When cap 17 is removed, the old cell or unit 15 can be removed (after merely lifting out spring 25) simply by grasping handle 13 and lifting out such cell. A new cell can then be dropped into place by means of its screw handle, following which spring 25 can be dropped back into place and cap 17 screwed back into place.

Prior moisture cell constructions have required that the stream flow completely through a porous capacitor electrode, from one side thereof to the other. This means that it is impossible to use cells of this type for fluids of high water content (such as 1,000 p.p.m. of water), since in such use the drops of water may easily be of sufficient size to bridge across and short-circuit the capacitor electrodes. With cells of this prior type, it is impossible to provide electrical insulation to prevent this short-circuiting, since such insulation would plug up the pores (in the electrodes) through which the fluid must flow. With the present construction, on the other hand, the fluid is not required to flow through either of the two capacitor electrodes. Therefore, with the present cell, an electrically insulating coating (say, a "Teflon" coating on the order of five mils in thickness) can readily be provided on inner electrode 5, except on the outer (lower) face of hub 7, thus eliminating the possibility of short-circuiting of the electrodes by large drops of water; at the same time, such an insulating coating cannot interfere in any way with the fluid flow through the cell or sensing unit.

While various types of circuitry may be used for measurement of the capacitance provided by the assembly 5, 8, 3, there is illustrated in FIG. 3 a particular circuit arrangement which is of a type suitable for measurement of such small capacitance changes as occur in the operation of the present apparatus. The FIG. 3 circuit, and other suitable circuits having similar properties, are disclosed in Shawhan Patent No. 2,943,258, dated June 28, 1960. It may be noted that FIG. 3 herein corresponds to FIG. 12 of the aforesaid Shawhan patent.

In FIG. 3, the electrodes 3 and 5 are shown. These provide a capacitance which is referred to generally as 40. An oscillator indicated at 41 provides a relatively high frequency output, the frequency being subject to a very wide range of choice but being desirably in excess of the commercial alternating supply frequency which is provided at terminals 42 to the primary of a transformer 43 whose secondary is in series with the output connections of the oscillator 41. The inputs thus provided are fed to a voltage divider arrangement comprising a resistor 44 and a fixed capacitor 45. The junction of the last two elements is connected to the central conductor of a coaxial cable 46 the sheath of which is grounded. Through the impedance matching and tuned circuit arrangement indicated at 47, the characteristics of which are described in detail in said Shawhan patent, the signals are fed to a detecting assembly 48 which is desirably local to the capacitance which is to be measured. A diode 49 is connected between the input and ground, in series with the parallel arrangement of a resistor 50, the capacitance 40 to be measured, and a variable capacitor 51. An oppositely disposed diode 52 is connected between the input and ground, in series with the parallel arrangement of a resistor 53 and a fixed capacitor 54, which latter capacitor desirably has a value close to the total capacitance of 40 and 51. Resistors 50 and 53 are desirably equal. A selsyn receiver 55 is arranged to vary the capacitance of capacitor 51.

Referring back to FIG. 2, a suitable receptacle known as a "Condulet" may be secured directly to the body 16, immediately adjacent the bottom thereof, by means of the male threads illustrated at the bottom of body 16. The assembly 48 of FIG. 3 may be positioned in this "Condulet," and the lead 56 of FIG. 3 (which is connected to electrode 5 in this figure) may extend from this "Condulet" to solder lug 35 (FIG. 2). Thus, assembly 48 is local to the capacitance 3, 8, 5 to be measured.

Referring again to FIG. 3, a demodulating circuit 57 provides through capacitor 58 current to one winding of a reversible motor 59, a reference winding 60 of which is energized from the terminals 42. The arrangement is such that the direction of rotation of the motor is dependent upon the phase relationships of the currents fed to its windings. The motor 59 drives the selsyn transmitter 61 which is connected to drive the receiver 55. It also drives a pointer 62 movable with respect to a scale 63 which may be graduated directly in terms of moisture content of the hydrocarbon stream. As will be evident, the motor indicating arrangement thus provided may be replaced by an automatic recorder, to record the variations of moisture content of the stream with respect to time.

Since the circuit of FIG. 3 itself forms no part of the present invention, its operation and advantages need be only briefly described.

The input provided through the transformer 43 effects a switching action which causes, during one half-cycle, one of the diodes to conduct and the other to be cut off, while during the next half-cycle the reverse occurs. Consequently, the high frequency signal is affected, during successive half-cycles, alternately by the fixed capacitor 54 or the parallel arrangement of capacitors 40 and 51. The result is a modulated high frequency wave which through detector 57 gives rise to a phase shifted output serving to drive the motor 59 in one direction or the other, in dependence upon the relative capacitance values presented by the capacitor 54, on the one hand, or the parallel capacitors 40 and 51, on the other. Connections are so made that the motor 59 effects, through the selsyn arrangement, adjustment of the capacitor 51 to make equal, or to bring into a definite relationship, these capacitances. As will be evident, the resulting adjustment of the condenser 51 is then a measure of the capacitance at 40, and hence of the moisture content of the stream, whenever equilibrium adsorption conditions are achieved. The scale 63 may, accordingly, be calibrated in terms of stream moisture content.

The circuitry described is particularly advantageous for the measurement of very small capacitance changes, such as exist in the present type of apparatus. These changes are so small that, using most conventional capacitance measuring apparatus, varying distributed capacitances in a cable such as 46 would be of the same order of magnitude, or much larger, than the changes of capacitance to be measured. Due to the comparison arrangement afforded by the switching action in the portion 48 of the circuit, the measurements are quite independent of the unavoidable changes occurring elsewhere in the circuit, and particularly in the transmission line 46. The recording apparatus may, accordingly, be remote from the capacitance undergoing measurement.

It will be noted that the arrangement of the porous desiccant 8 between the electrodes 3 and 5 provides for very complete exposure of all portions of the desiccant to the hydrocarbon stream. As a result, the equilibrium moisture content conditions are rapidly established, with the result that the capacitance values quickly reflect changes in the moisture content of the stream.

The invention claimed is:

1. Apparatus for measuring the moisture content of a fluid stream, comprising a capacitive sensing unit through which said stream may flow, the effective capacitance of said unit, between its electrodes, varying as the moisture content of said stream varies, a housing adapted to be coupled into said fluid stream so that such stream can flow continuously therethrough, said housing having therein a seat near one end thereof; a removable closure at the other end of said housing, a compression spring bearing against both said closure and said unit to removably maintain the latter in position on said seat at said one end of the housing, the stream then flowing through said unit; and an electrical contact mounted in said housing in juxtaposition to said seat but insulated from the housing, so as to automatically contact one of the electrodes of said unit when the latter is in position on said seat.

2. Apparatus for measuring the moisture content of a fluid stream, comprising two spaced impervious conductive electrodes presenting opposed faces to each other, a water-sorptive dielectric material between said faces, means securing said electrodes and said dielectric material together in assembled relation, said electrodes and said dielectric material together providing a capacitive sensing unit through which said stream may flow, the effective capacitance of said unit, between said electrodes, varying as the moisture content of said stream varies; a housing adapted to be coupled into said fluid stream so that such stream can flow continuously therethrough, said housing having therein a seat near one end thereof; means removably securing said unit in position on said seat in such a manner that the stream then flows through said dielectric material in a direction substantially parallel to said faces, said last-mentioned means including a removable closure at the other end of said housing, and securing means engaging both said closure and said unit to maintain the latter in position at said one end of the housing; and an electrical contact mounted in said housing in juxtaposition to said seat but insulated from the housing, so as to automatically contact one of the electrodes of said unit when the latter is in position on said seat.

3. Apparatus as defined in claim 2, wherein said securing means comprises a compression spring bearing against both said closure and said unit.

4. Apparatus as defined in claim 2, wherein said two electrodes are in the form of coaxial cylinders, whose cylindrical surfaces respectively provide said opposed faces.

References Cited by the Examiner

UNITED STATES PATENTS

| | | | |
|---|---|---|---|
| 2,453,584 | 11/1948 | Newton | 324—61 X |
| 2,599,583 | 6/1952 | Robinson et al. | |
| 2,807,956 | 10/1957 | Doble | 73—53 |
| 2,913,893 | 11/1959 | Mathews et al. | 73—53 X |
| 2,915,701 | 12/1959 | Broerman. | |
| 2,941,174 | 6/1960 | Richards | 73—73 X |
| 2,976,728 | 3/1961 | Brogan et al. | |
| 3,164,004 | 1/1965 | King | 73—336.5 X |

DAVID SCHONBERG, *Primary Examiner.*